United States Patent Office 3,145,793
Patented Aug. 25, 1964

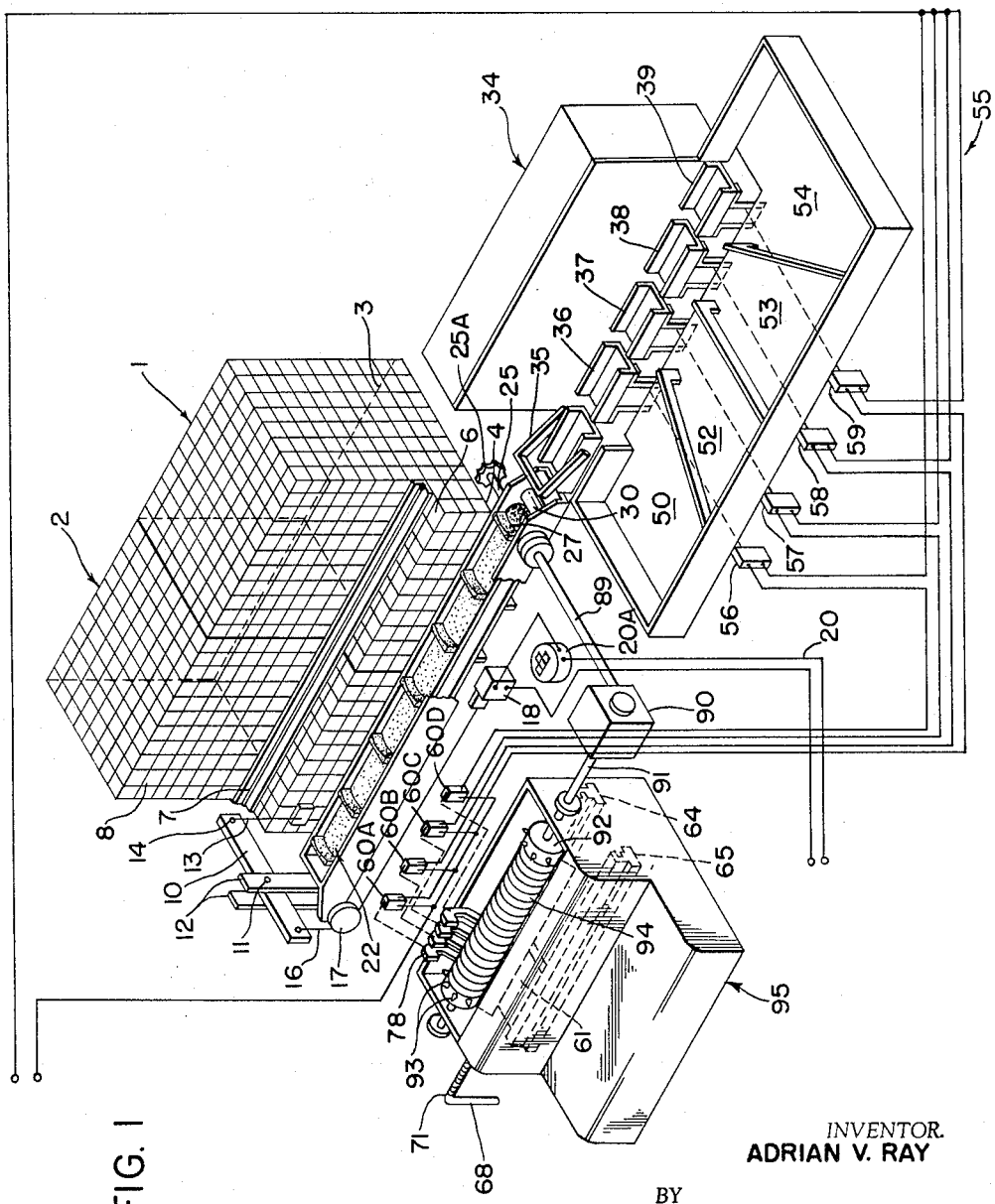

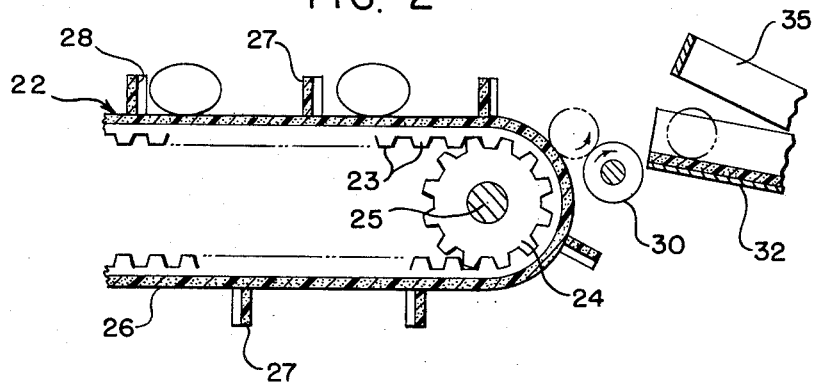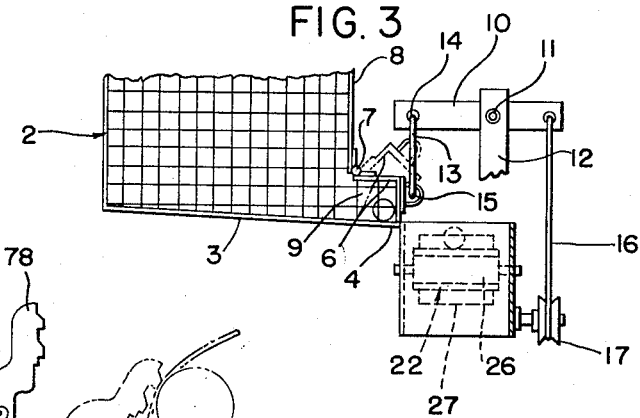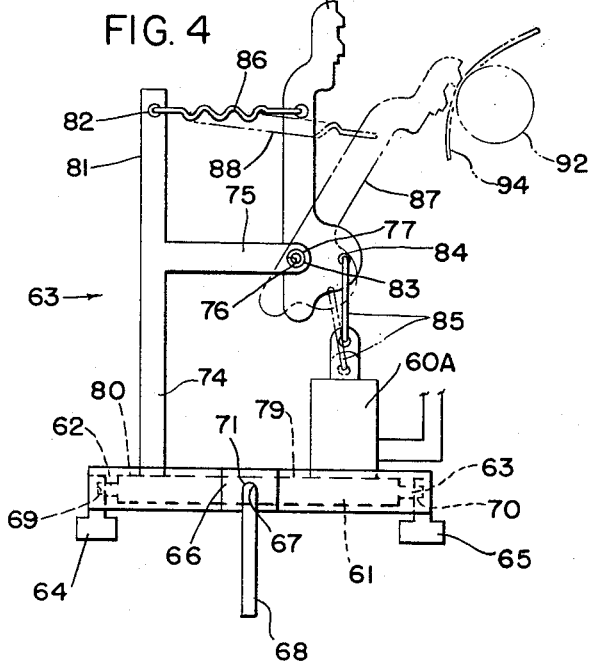

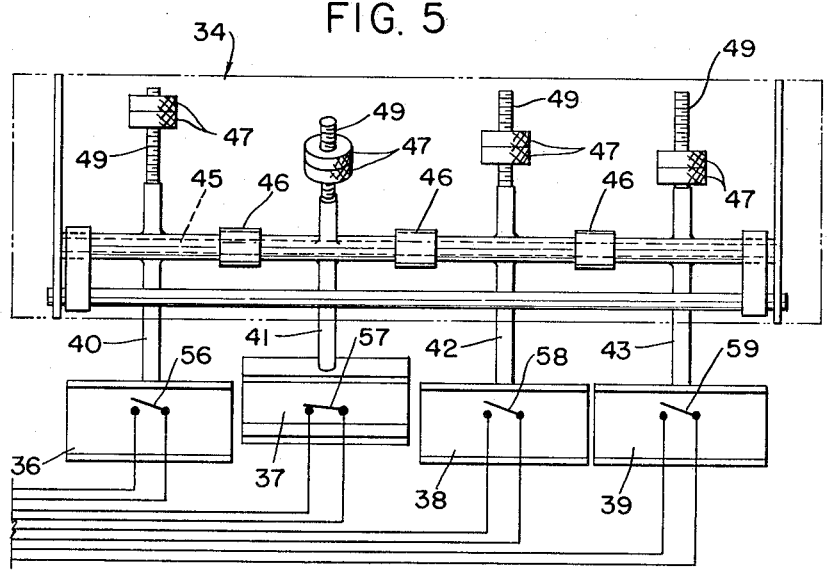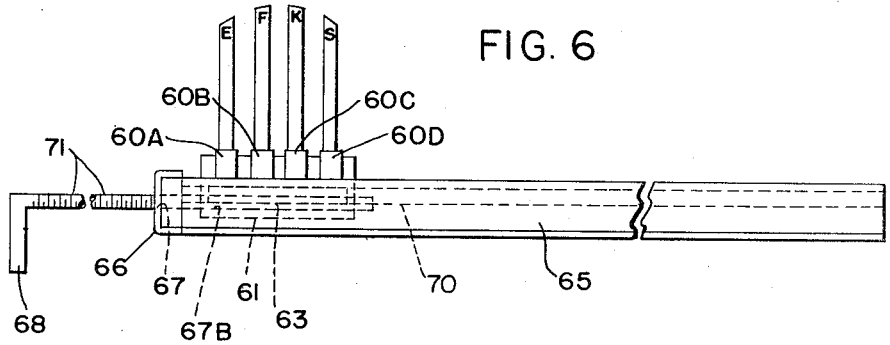

3,145,793
PROCESS AND APPARATUS FOR GATHERING, GRADING AND RECORDING
Adrian V. Ray, 1000 Davis Ave., Terre Haute, Ind.
Filed Oct. 8, 1963, Ser. No. 314,750
5 Claims. (Cl. 177—8)

This invention relates to a process and an apparatus for automatically gathering, grading, and recording the egg production of birds located in individual, adjacent compartments.

Broadly, the invention concerns a method and apparatus in which a plurality of individual, adjacent compartments having tilted floors are provided to confine the birds. Each of the compartments have openings adjacent the lowermost edges of the floors such that closure means in association with the openings can be actuated for permitting the gravity feed of eggs from the compartments.

A conveying means is located adjacent and below the closure means to receive the eggs as they are fed from the compartments. The conveying means sequentially advances the eggs away from their respective compartments and is suitably provided with partition means insuring this sequential advance. Egg grading means sequentially receive the eggs from the conveying means and segregate each of the eggs into groups by weight. Each of the groups by weight cover an exclusive range of weight.

A record sheet is provided in association with means for advancing it in proportionate response to the movement of the conveying means. Facing the record sheet is a plurality of means for producing indicia on the record sheet, each of which means for producing indicia corresponds to one of the groups by weight. The means for producing indicia on the record sheet are actuated in response to the segregation of an egg into its particular group by weight such that a visual indicia of the group by weight is provided on the record sheet and the respective compartment source of each of the eggs is indicated by the relative position of the indicia on the record sheet. In this manner a record showing the weight classification of the eggs gathered and the tabulation of the egg weight for each individual hen may be easily made from the record sheet, giving a complete and accurate record of production for use in quality control with a minimum of human labor involved.

The foregoing results have been accomplished according to the principles of the invention with a minimum of expense; and the resulting apparatus is relatively simple to construct of easily obtained components, many of which are commercially available. Accordingly, the invention provides an efficient, inexpensive process and apparatus for gathering, grading, and recording egg production of birds.

It is a primary object of the apparatus and process according to the invention to reduce the manual labor involved in the process of gathering, grading, and recording egg production of a "flock" of birds. This is accomplished by means of a conveyor moving adjacent the compartments in which the birds are kept, which conveys the eggs to a device which automatically grades and records the eggs without the necessity of human handling.

A further object of the invention is to provide a record sheet which indicates the weight classification and source of each of the eggs gathered from a "flock" of birds in an extremely simplified and efficient manner requiring little human attention.

Other and more specific objects of the novel process and apparatus of this invention will become apparent from the detailed description to follow.

FIG. 1 is a fragmentary partially schematic drawing of the apparatus combination constructed according to the principles of the invention.

FIG. 2 is a schematic cross sectional view of the conveying means and a portion of the egg receiving means of the apparatus of FIG. 1.

FIG. 3 is an end view of the partition and conveying portion of the apparatus of FIG. 1.

FIG. 4 is a schematic end view of the recording apparatus portion of FIG. 1.

FIG. 5 is a schematic plan view of a portion of the weight responsive means of FIG. 1.

FIG. 6 is a fragmentary schematic view of the screw feed and the indicia producing means of the apparatus of FIG. 1.

Referring more specifically to the illustrated embodiment of FIG. 1, a plurality of adjacent wire cages having equal widths are schematically represented by the numerals 1 and 2. It is within these cages that the birds are confined such that each bird has its own individual compartment. The cages 1 and 2 have a floor 3 which it tilted down to a lowermost edge 4 running along one side of the cages. A door 6 appropriately hinged as at 7, for instance, is provided as a closure means for an opening in the common side wall 8 of the cages 1 and 2.

The door 6 in the illustrated embodiment is in the form of an angle member such that the ends of the cages and partitions between adjacent cages have a small projection 9 which extends out flush with the lowermost edge 4 of the cage floor. This provision, of course, is important in that it keeps the hens away from the eggs after they have been laid. The eggs are laid on the cage floor and then rolled down against the door 6 adjacent the lowermost edge 4 of the cage to the area bounded by the projection 9. This portion of the cage is of a dimension such that the hens are prevented by the cage side 8 from getting at the egg.

Suitable means for opening the door 6 to the position shown in phantom in FIG. 3 are provided in the form of a lever 10 pivoted at point 11 by means of a pin through vertical support members 12. The lever 10 is attached to the door 6 by means of a link 13 pivoted at point 14 with respect to the lever 10 and pivoted at point 15 with respect to the door 6 by means of a suitable eyelet or other appropriate privotal fastener on the door 6. In this manner, movement of the lever 10 about the pivot point 11 in a clockwise direction will raise the door 6 by pivoting it about the hinge 7 to the position shown in phantom in FIG. 3. The lever 10 is moved about the point 11 on vertical support members 12 by means of a wire 16 fastened to the lever 10 on the opposite side of the pivot point 11 from the link 14.

A suitable arrangement for pulling the wire 16 to move the lever 10, such as pulley 17 and solenoid 18, is illustrated whereby the actuation of the solenoid 18 draws the wire 16 around the pulley in a manner which causes the clockwise movement in the lever 10. Solenoid 18 is connected in a circuit 20 with a switch 20a such that the circuit is normally open, but upon actuation of the switch 20a to close the circuit, the door 6 to the cages 1 and 2 will be opened to permit a gravity feed of the egg from the lowermost edge 4 of the tilted cage bottom 3 onto a conveyor 22 lying adjacent to and just below the lowermost edge 4 of the cage bottom.

The conveyor 22 is an endless belt of rubber or other suitable material having teeth 23 adapted for co-operation with a drive means or sprocket 24 mounted on a driven shaft 25. A suitable idler sprocket is provided on the inside of the endless belt 22 at the end opposite the drive sprocket 24. Laminated or otherwise suitably provided on the outside of the rubber tooth portion of the conveyor 22 is a layer of soft material 26 preferably constructed of foam rubber or soft expanded plastic. The entire belt and sprocket unit driven by shaft 25 is started and stopped at appropriate times (usually once daily) by means of conventional controls for any suitable motor which is used to drive the shaft 25 through a power receiving sprocket 25a or the like mounted thereon.

Attached to the layer of soft material 26 or integral therewith is a plurality of partitions or cleats 27 of soft rubber or foam material. The cleats are provided with a concave surface or pocket 28 to hold the eggs in centered relation to the conveyor 22 and to orient the eggs with their longest dimension transverse to the belt so that they are presented in the proper manner to be received by the next station. The cleats 27 are regularly spaced about the belt in a manner which insures that when a cleat is lined up with one side of an individual cage another cleat is lined up with the opposite side of the cage and so on throughout the length of the conveyor 22. This relationship is extremely important, although it is not important how many cleats per cage are used on the belt. It will be seen that the illustrated embodiment shows that sufficient cleats 27 are provided so that the conveyor portion adjacent the cage when aligned with one of the cleats, as before mentioned, divides the conveyor into three distinct partitioned compartments. This is done as a convenient manner of limiting slippage of the egg relative to the soft surface 26 of the conveyor 22.

In addition, as will be seen in FIG. 2, the cleats serve the function of dispensing the eggs from the conveyor in a manner to be explained.

In order to insure that the record sheet is accurately kept, it is important the the circumference of the circle about drive shaft 25 which would be formed by an extension of the curved portion 22a of the conveyor 22 be substantially equal to the width of the individual cages. In this manner the conveyor at any position will have the cleats lined up with all of the cage partitions if they are lined up with any one of them.

Adjacent the end of the conveyor 22 an idler roller or similar means 30 is provided in spaced relation to the conveyor 22 such that the oriented eggs being brought along the conveyor by action of the partitions or cleats 27 against them are engaged by the idler roller 30 at the end of the conveyor 22 and then moved over as the soft partition or cleat 27 exerts further forces on the egg as the partition 27 continues around the curve at the end of the conveyor 22 formed by the sprocket 24. Since the cleats 27 are of rubber or foam, they will bend or deflect in order to provide a resilient urging force against the egg to move it over the idler wheel 30 which is gentle enough to prevent fracturing of the egg shell. In addition to this, it is important that the cleats be of soft and pliable material so that they may pass by the idler 30.

A foam rubber covered wood plate 32 or other suitable egg receiving ramp means is provided adjacent the idler 30 so that eggs transferred come from the conveyor 22 around a portion of the periphery of the idler wheel 30 and are then deposited on the conveying ramp 32 in their oriented position to permit the egg to properly enter the egg grader 34. A suitable upper guide member 35 insures that the eggs when transferred over the idler roller 30 do not skip out of the desired path.

The egg grader 34 is an element which is commercially available from several sources of supply, and the one illustrated is sold by Montgomery Ward & Company, Inc. of Chicago 7, Illinois, and is capable of grading eighteen hundred eggs per hour. The egg grader 34 automatically separates eggs into four grades with precision accuracy. The illustrated egg grader is Model No. 87 FE 1031 Y0 in the Montgomery Ward 1963 Farm Catalogue. It is not required, however, that an egg grader of such an elaborate proportion be utilized and that a purely mechanical egg grader with adjustable individual grading scales based on basic mechanical principles can be utilized. An example of this type is shown in the Montgomery Ward & Company, Inc. 1963 Farm Catalogue as Model No. 87 FE 1032.

Other weight sensitive egg grading devices are also appropriate, and the particular model used may be varied as will be readily understood by those skilled in the art. The basic principle upon which the egg graders are based can be seen from FIG. 5 which shows a four-scale grader. The pans of the scales 36, 37, 38, and 39 are suitably provided with two rails such that the transversely oriented eggs are passed from the ramp or platform 32 directly onto the first scale 36. The scales are located respectively on pivoting arms 40, 41, 42, and 43 which all rotate about a common fixed shaft 45 having collars 46 maintaining the individual scales in a properly aligned relationship. On the ends of the scales opposite the side of the arms 40, 41, 42, and 43 are provided adjustable weights 47 which may be moved in and out along threaded studs 49 projecting from the ends of the levers 40, 41, 42, and 43. The weights 47, of course, have suitable threads for engagement with the threads of the studs 49 so that they may be positioned at various points to provide selective counterbalancing for the scale. A stationary bar 48 is provided to maintain the horizontal position of the levers and prevent rotation to the equilibrium position. As the eggs are received on the ramp or platform 32, they move by means of gravity onto the first scale or balance 36 which has its weight 47 adjusted so as to permit pivotal displacement of the scale 36 only by eggs having a certain minimum weight. Any egg exceeding this certain minimum weight is graded as the largest size because it has sufficient force to overcome the counterbalancing weight 47 to pivot the scale 36 about the shaft 45 to thereby lower the scale 36 so that an egg is gravity fed into bin 50 which is the collection spot of the heaviest and largest group of eggs by weight. Partitions 52, 53, and 54 on the egg grading mechanism 34 are the respective collection areas for mutually exclusive weight ranges progressively from the largest to smallest represented by scales 37, 38, and 39.

As will be obvious to those skilled in the art, if an egg does not have sufficient weight to pivot the scale 36, it rolls forward by means of gravity to the next adjacent scale 37. Here the egg may counterbalance the weight 47 associated with the scale 37. If not, the egg will move forward to the next progressive scale where it may be lowered by gravity into the bin 53 providing its weight exceeds the minimum necessary to tilt the scale 38 down for dispensing of the egg into the collecting area 53. If the egg is not of sufficient weight to tip any of the scales, 36, 37, 38, the scale 39 is set such that any weight of egg will tip the scale and collect the eggs in the smallest grade bin or partition area 54. Accordingly, once the eggs have passed through the grading unit 34, they are divided into mutually exclusive weight range groups so that premium prices for properly graded eggs may be charged in marketing the eggs.

Again, it is to be understood that the operation of the egg graders 34 regardless of whether done electrically or mechanically will produce the same results since they are, in general, based upon the principles described with the schematic representation in FIG. 5.

In conjunction with the egg grader 34, means for sensing which of the particular scales 36, 37, 38, or 39 a particular egg has sufficient weight to actuate are provided. This is done in a convenient form as will be seen in FIG. 1 by means of conventional contact switches or it may be provided by conventional electric eyes which sense the dispensing of an egg from a particular scale.

Suitable switches such as shown at 56, 57, 58 and 59 are provided in the illustrated embodiment for each of the scales 36, 37, 38, and 39. These switches are provided in any suitable manner which will be obvious to those skilled in the art such that they are open normally but are closed whenever an egg has sufficient weight to pivot a particular balance on the shaft 45 to dispense the egg into its respective collection area. In FIG. 5 the scale 37 is shown in the position in which an egg of sufficient weight would deflect it such that the switch 57 is closed. For each scale there is a branch of the circuit 55 which, when closed for the passage of current by means of the scale being tilted as is the scale 37 in FIG. 5, actuates a solenoid switch connected in the circuit therewith. The solenoids 60a, 60b, 60c, and 60d are mounted on a plate 61 in a semicylindrical fashion about one edge thereof.

The plate 61 has bars 62 and 63 substantially throughout its length and slidably engaged by grooves 69 and 70 respectively of tracks 64 and 65. The tracks 64 and 65 are mounted stationarily. A stationary nut bar 66 is provided which may be stationarily mounted to the ends of the tracks 64 and 65 or may be stationarily mounted to any other fixed object. In the center of the nut bar is a threaded hole 67. In the center of plate 61 is a threaded hole 67b of the same thread and diameter of hole 67.

A feed screw 71 is rotated into the hole 67 and subsequently into hole 67b by means of a handle 68 of the bolt or screw 71. The bolt 71 is of sufficient length to propel the carriage 61 the length of the tracks 64 and 65 by means of a reactionary force against the nut bar 66 which overcomes the friction created between the bars 62 and 63 and their respective slots 69 and 70. Mounted on the carriage plate 61 are the four solenoids, 60a, 60b, 60c, and 60d in substantially the same manner. Each solenoid is mounted on one side 79 of the carriage plate 61. This may be accomplished by any conventional bolting, welding, or fastening means well known to those skilled in the art.

On the other side 80 of the carriage plate 61 is mounted a T support member 63 having the leg 74 stationarily fastened by any conventional means to the side 80 of the carriage plate 61. The leg 75 has a hole 76 in its end substantially located in the end of the leg 75 and extends, in general, in the direction of the solenoid. Leg 81 extends upward of leg 75 and has a hole 82 therein.

A conventional typewriter key 78 or the like is pivotally mounted on the leg 75 by means of a pin 77 extending through a hole 83 in the key 78 in the manner which will allow the key 78 to revolve about the pin 77. A hole 84 in the key member 78 is connected by a mechanical link 85 to the solenoid 60a in a manner that will allow pivotal movement about the pin 76 when the solenoid 60a is activated. In order to retain the key member 78 in a favorable position, it is biased by means of a spring 86 stationarily mounted in the leg 81 by means of a pivotal connection through hole 82. Thus, when the solenoid is activated, the key member 78 will move to the position shown as 87 by pivoting about the pin 77 and stretching the spring 86 to position 88. The forward movement of the key member 78 to position 87 will effect the writing on a piece of paper in a manner well known to those skilled in the typewriter art. When the solenoid is deactivated, the biasing spring 86 will return the key member 78 to its original position. It is to be understood that the four solenoids are in no way restrictive but may be added to as the weighing divisions are defined more clearly and as more scales are provided to define a more distinct weight of eggs graded.

It is further to be understood that these solenoid systems, as previously described, are mounted in a semicylindrical fashion or any other conventional manner in that the geometric configuration of the key's mechanism and pivotal movement of the keys yield a mechanical movement which locates the type indicia in the essentially same area if the paper is not moved. More specifically, if the solenoid 60a was activated, a given indicia would be printed. If the paper is not moved when the solenoid 60b is activated, the specified symbol of indicia b called f in the FIG. 6 would be superimposed on the indicia of solenoid 60a (e). If the paper again was not moved and solenoid 60c was activated the indicia k of solenoid c would be superimposed over both indicia e and indicia f. Thus, it is clearly seen that since all of the letters converge, a row of indicia could be effected by merely advancing the paper in a vertical movement past the indicia creating means.

Furthermore, a conventional mechanism enabling the paper to be advanced in a different direction past the indicia creating means could obviously be provided if mechanically linked to movement proportional to the conveyor movement.

In order to obtain a vertical column record of the grades of eggs and the location from which they came, a rubber roller 92 is provided with pins 93 located about the periphery of the ends of the roller 92 to prevent slippage of the paper 94 as the roller 93 is rotated. A suitable container and support means 95 for the roller 92 is also provided. The rubber roller 92 is rotated by a shaft 91 which is connected to a conventional gear box 90 which is powered by a portion 89 of the driven shaft 25.

The gear box 90 converts the speed of rotation of the shaft 25 to an output speed of rotation for the shaft 91 which will rotate the roller 92 a convenient proportional distance per revolution of this power shaft 25. Since the distance traveled by the conveyor is directly related to the number of rotations of drive shaft 25, a direct proportional ratio between the movement of the conveyor and the record sheet 94 is thereby effected.

From the foregoing, it will be seen that any number of cages, each having a hen therein, will be supplied with an appropriately dimensioned conveying means 22 such that when the egg gathering operation is to be performed the switch 20 is actuated to energize the solenoid 18 and thereby move the lever 10 to open the closure 6. The eggs then are gravity fed onto the conveyor 22 so that substantially all of the eggs will be on the conveyor before it has started up.

Appropriate conventional power means such as an electric motor driven "bicycle" chain then rotates the shaft 25 by means of the sprocket or a pulley 25a so that the conveyor is advanced to sequentially deposit the eggs in the grader. As previously explained, as each egg is graded, it will actuate the corresponding solenoid, which by means of a mechanical linkage to the appropriate indicia producing key will type the grade indicia on the record sheet. This sheet is advanced continuously as the conveyor 22 is advanced through the previously described proportional drive means directly connected to the drive shaft 25 through the gear box.

After all of the eggs have been graded and all of the eggs accounted for on the record sheet, both as to grade indicia and cage, the apparatus may be turned off and the device readied for the next day's operation. This is done by advancing the feed screw 71 in the fixed nut by turning the handle 68 until the solenoid mechanism is shifted with respect to the record sheet one space. The record sheet is then returned to the start position so that the columns will run coextensively on the sheet vertically and parallel to each other. It will be obvious that this shifting will be done on a daily basis since it is only required that the eggs be gathered once daily. If a record sheet having spaces for thirty vertical columns is provided, the same sheet may be used for a month by merely starting the paper at the top with the first indicia of each day being adjacent the first indicia of the previous day and shifting the keys and solenoid by means of the screw 71 one column each day before using the apparatus.

It will, of course, be obvious from the foregoing description that on any given day that the hen of a particular cage does not produce an egg, a blank spot in the vertical column will appear for that day. This is true because the partitions 27 on the conveyor insure that the eggs move along into the egg grader at a speed proportional to the advance of the record sheet. Accordingly, where any blank spaces occur in the vertical columns no egg has been produced by the hen in the corresponding cage for that day and this is recorded because of the spacial relationship of this blank spot to the other indicia in that day's vertical column.

For ease of description the principles of the invention have been set forth in full in connection with but a single illustrated embodiment. It is not my intention that the illustrated embodiment nor the terminology employed in describing it be limited inasmuch as variations of these may be made without departing from the spirit of the invention. Rather, I desire to be restricted only by the scope of the appended claims.

I claim:

1. An apparatus for gathering, grading, and recording egg production of birds located in individual adjacent compartments having tilted floors and closure means for openings adjacent the lowermost edges of said floors comprising in combination:
   means for opening said closure means to permit said eggs to be fed therefrom,
   means for conveying and sequentially advancing said eggs away from their respective compartments,
   means for sequentially receiving said eggs and segregating each of said eggs into groups by weight,
   means for advancing a record sheet in proportionate response to the movement of said conveying means,
   a plurality of means for producing indicia on said record sheet each of which means corresponds to a group by weight,
   means for actuating the corresponding means for producing indicia in response to the segregation of an egg into its particular group by weight such that a visual indicia of the group by weight is provided on said record sheet and the respective compartment source of each of said eggs is indicated by the relative position of said indicia on said record sheet.

2. An apparatus for gathering, grading, and recording egg production of birds comprising:
   a plurality of individual adjacent compartments having tilted floors,
   openings in said compartments adjacent the lowermost edges of said floors,
   closure means for permitting removal of said eggs from said compartments,
   conveying means located adjacent and below said closure means to receive and sequentially advance said eggs away from their respective compartments,
   means for sequentially receiving said eggs and segregating each of said eggs into groups by weight,
   means for advancing a record sheet in proportionate response to the movement of said conveying means,
   a plurality of means for producing indicia on said record sheet each of which means corresponds to a group by weight,
   means for actuating the corresponding means for producing indicia in response to the segregation of an egg into its particular group by weight such that a visual indicia of the group by weight is provided on said record sheet and the respective compartment source of each of said eggs is indicated by the relative position of said indicia on said record sheet.

3. An apparatus as in claim 2 including means for advancing said means for producing indicia across the width of said record sheet after the completion of each column of indicia.

4. An apparatus for gathering, grading, and recording egg production of birds comprising:
   a plurality of individual adjacent compartments having tilted floors,
   openings in said compartments adjacent the lowermost edges of said floors,
   a door for permitting removal of said eggs from said compartments,
   a conveyor belt located adjacent and below said door and having cleats mounted on said belt to form movable sections for receiving and sequentially advancing said eggs away from their respective compartments,
   a driving means for said conveyor belt,
   a plurality of adjacent balanced levers of progressively lesser resistance to pivotal downward movement for sequentially receiving said eggs and segregating each of said eggs into groups by weight,
   a gear box connected to said conveyor belt driving means for advancing a record sheet driving means in proportionate response to the movement of said conveying means,
   a record sheet in engagement with said record sheet driving means,
   a plurality of pivoted arms for producing indicia on said record sheet, each of said keys corresponding to a group by weight,
   means for actuating said pivoted arms for producing indicia in response to the segregation of an egg into its particular group by weight such that a visual indicia of the group by weight is provided on said record sheet and the respective compartment source of each of said eggs is indicated by the relative position of said indicia on said record sheet.

5. An apparatus for gathering, grading, and recording egg production of birds comprising:
   a plurality of individual adjacent compartments having tilted floors,
   openings in said compartments adjacent the lowermost edges of said floors,
   a door for permitting gravity feed of said eggs from said compartments,
   a conveyor belt located adjacent and below said door and having cleats mounted on said belt to form movable sections for receiving and sequentially advancing said eggs away from their respective compartments,
   a roller in spatial relationship with the end portion of said conveyor belt for orienting said eggs with respect to a plurality of adjacent balanced levers of progressively lesser resistance to pivotal downward movement for sequentially receiving said eggs and segregating each of said eggs into groups by weight,
   a gear box mechanically connected to said conveyor belt to advance a record sheet in proportionate response to the movement of said conveying means,
   a plurality of solenoid actuated keys for producing indicia on said record sheet, each of said keys corresponding to a group by weight,
   means for actuating said solenoids for producing indicia in response to the segregation of an egg into its particular group by weight such that a visual indicia of the group by weight is provided on said record sheet and the respective compartment source of each of said eggs is indicated by the relative position of said indicia on said record sheet.

References Cited in the file of this patent

UNITED STATES PATENTS

| | | |
|---|---|---|
| 368,063 | Brown | Aug. 9, 1887 |
| 2,312,774 | Peterson | Mar. 2, 1943 |
| 2,678,726 | Root | May 18, 1954 |
| 2,781,993 | Magnuson | Feb. 19, 1957 |
| 2,835,386 | Marzolf | May 20, 1958 |
| 2,886,173 | Scott | May 12, 1959 |
| 2,934,393 | Mixson | Apr. 26, 1960 |
| 2,993,592 | Mumma | July 25, 1961 |
| 2,994,430 | Reck et al. | Aug. 1, 1961 |
| 3,087,561 | Dundham | Apr. 30, 1963 |